US008300701B2

United States Patent
Flecchia

(10) Patent No.: US 8,300,701 B2
(45) Date of Patent: Oct. 30, 2012

(54) OFFSPEED PLAYBACK IN A VIDEO EDITING SYSTEM OF VIDEO DATA COMPRESSED USING LONG GROUPS OF PICTURES

(75) Inventor: Mark Flecchia, Burlington, MA (US)

(73) Assignee: Avid Technology, Inc., Burlington, MA (US)

( * ) Notice: Subject to any disclaimer, the term of this patent is extended or adjusted under 35 U.S.C. 154(b) by 1471 days.

(21) Appl. No.: 11/298,866

(22) Filed: Dec. 9, 2005

(65) Prior Publication Data
US 2007/0133951 A1 Jun. 14, 2007

(51) Int. Cl.
*H04N 7/12* (2006.01)

(52) U.S. Cl. ......... 375/240.25; 375/240.12; 375/240.26; 375/240.28; 725/86; 725/91

(58) Field of Classification Search ............... 375/240.25
See application file for complete search history.

(56) References Cited

U.S. PATENT DOCUMENTS 6,735,253 B1 * 5/2004 Chang et al. ............. 375/240.16
2004/0220791 A1 * 11/2004 Lamkin et al. ................. 703/11
2006/0184684 A1 * 8/2006 Weiss et al. ................... 709/231

* cited by examiner

*Primary Examiner* — Twyler Haskins
*Assistant Examiner* — Brendan McCommas
(74) *Attorney, Agent, or Firm* — Oliver Strimpel

(57) ABSTRACT

An editing system handles offspeed and full speed playback of long GOP compressed video information by having one decoder for full-speed or slower forward playback of long GOP compressed motion video information, and a second single-frame, stateless decoder for use for off-speed playback. When compressed data is read from a file, the compressed data for at least one complete group of pictures is read into a buffer, herein called a compressed data buffer. A data structure, herein called a frame ring, is constructed to describe each image in the compressed data buffer. The single-frame, stateless decoder receives decompression parameters in addition to the compressed data for each image from this buffer. If the compressed data is a B-frame or P-frame, then uncompressed data for any other images (i.e., reference frames) required by the decoder to decompress the frame also is input to the single-frame, stateless decoder. If the uncompressed data for the reference frames is not already in a cache, these reference frames are decompressed and the uncompressed data for the reference frames as used by the decoder is stored in the cache prior to the decompression of the B-frame or P-frame.

17 Claims, 4 Drawing Sheets

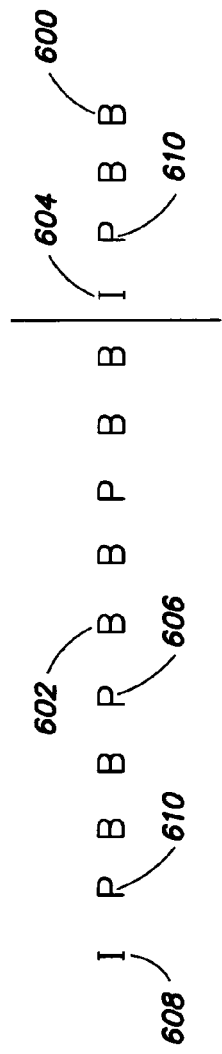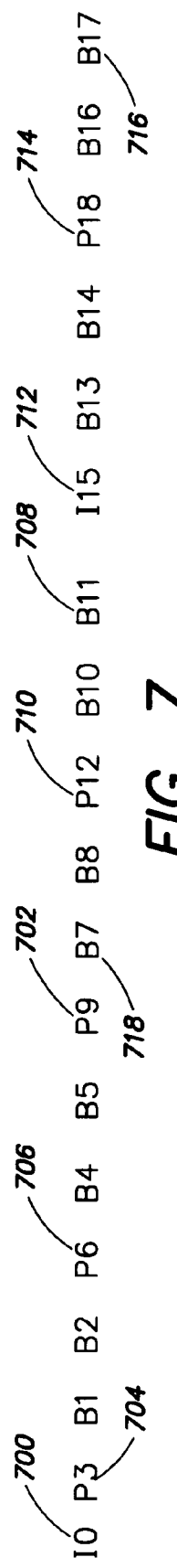
FIG. 6
FIG. 7

OFFSPEED PLAYBACK IN A VIDEO EDITING SYSTEM OF VIDEO DATA COMPRESSED USING LONG GROUPS OF PICTURES

BACKGROUND

There are several formats for compressing motion video information. Some compression formats use intraframe compression, while other compression formats use both interframe and intraframe compression. A compression format that uses both interframe and intraframe compression is commonly called a long GOP compression format because a sequence of images is broken into several groups of images (a group of pictures or GOP) that are compressed together. In particular, in each group of pictures, at least one image is intraframe encoded and is typically called an I-frame. Some images are compressed based on a difference from a prior image. These images are referred to as being predictively encoded or P-frames. Yet other images are compressed based on a difference between two other images. These images are referred to as being bidirectionally encoded or B-frames. I-frames and P-frames also are called reference frames.

Some long GOP compression formats are included in standards such as, but not limited to, the standards commonly known as MPEG-2 (formally known as ISO/IEC 13818-2 or ITU-T Rec. H.262) and H.264 (formally known as ISO/IEC 14496-10 or ITU-T Rec. H.264). Other long GOP compression formats may borrow concepts from or use parts of these standards. For example, a format known as HDV encodes a high-definition image sequence using MPEG-2 encoding. Other example long GOP compression formats include MPEG-4, AVC and VC-1. MPEG-2 permits groups of pictures to be compressed using only I-frames, a combination of I-frames and P-frames, or a combination of I-frames, P-frames and B-frames.

The compressed data resulting from compressing motion video information usually is stored in a data file. An example data file format is the Material eXchange Format (MXF), which is the subject of the standardization process of the Society of Motion Picture and Television Engineers (SMPTE), and is defined in documents including SMPTE S377M through 394M, with SMPTE Engineering Guidelines EG41 and 42.

Image index information for compressed motion video information is used to map the temporal position of an image in decompressed motion video information to a position of its corresponding compressed data in the compressed bitstream. Temporal positions used with the image index information correspond to the desired playback order. The image index information may include a known amount of data for each image if the compression process produces the same amount of compressed data for each compressed image. If the compression process produces a different amount of data for each compressed image, which is typical for long GOP compression formats, then an image index is created and used.

In some long GOP compression formats, such as MPEG-2, the temporal order of the compressed images is different from the order in which the compressed data appears in the compressed bitstream. Thus the image index maps the temporal order of images to the bitstream order of the compressed data for the images and to the position of the compressed data in the compressed bitstream. Such an image index is described in U.S. Pat. Nos. 6,337,880, 6,584,152 and 6,792,433.

Because long GOP compression formats were designed primarily for continuous playback, long GOP compressed motion video information presents challenges for editing systems that use such video information to create video programs. Editing systems generally permit an editor to specify a sequence of scenes, where each scene is defined by a reference to video information (called a source) and a range within that video information (usually specified by a starting image or mark-in point and an ending image or mark-out point). Generally, an editing system permits an editor to specify any image within a source as a start or stop point. When such a sequence of scenes is played back, the editing system identifies the group of pictures within which each start point for a scene is located, and decompresses at least part of that group of pictures that precedes the desired start point. This decompression adds complexity to an editing system that uses long GOP compressed motion video information.

There are other operations that an editor may perform while editing a video program that become more complex when the editing system uses long GOP compressed motion video information. These operations include reverse play, fast forward play, jogging, shuttling, scrubbing, trimming and single frame playback. When playing back long GOP compressed motion video information at a rate that is faster than full-speed playback (such as for shuttling or jogging operations), or in reverse, or by accessing a single frame (such as for scrubbing or trimming operations) each frame to be played back is, in essence, randomly accessed from the stored compressed bitstream. These kinds of playback operations (faster than full-speed, reverse playback and single frame playback) are referred to as "off-speed" playback. Because most frames require compressed data from more than one frame to be decompressed, random access of each individual frame during offspeed playback can require significant processing.

SUMMARY

An editing system handles offspeed and full speed playback of long GOP compressed video information by having one decoder for full-speed or slower forward playback of long GOP compressed motion video information, and a second single-frame, stateless decoder for use for off-speed playback. When compressed data is read from a file, the compressed data for at least one complete group of pictures is read into a buffer, herein called a compressed data buffer. A data structure, herein called a frame ring, is constructed to describe each image in the compressed data buffer. The single-frame, stateless decoder receives decompression parameters in addition to the compressed data for each image from this buffer. If the compressed data is a B-frame or P-frame, then uncompressed data for any other images (i.e., reference frames) required by the decoder to decompress the frame also is input to the single-frame, stateless decoder. If the uncompressed data for the reference frames is not already in a cache, these reference frames are decompressed and the uncompressed data for the reference frames as used by the decoder is stored in the cache prior to the decompression of the B-frame or P-frame.

The cache may use a least-recently-used replacement strategy, and may hold uncompressed data for a number of reference frames. For example, for HDV material, the cache may be size to store uncompressed data for about five to seven reference frames.

Each stream or track of video information available in an editing system for editing a video program may have its own decoder with its own cache. However, because there may be many decompression streams, allocation of the cache for a stream may be delayed until it will be used.

BRIEF DESCRIPTION OF THE DRAWINGS

FIG. 6 illustrates an example where an image in one group of pictures has already been decompressed and an image from a prior group of pictures has now been indicated as the desired picture to be displayed.

FIG. 7 illustrates an example of how a condition arises in which uncompressed data for the first reference frame for a B-frame is in the cache, but uncompressed data for the second reference frame is not in the cache.

DETAILED DESCRIPTION

Figure 1:
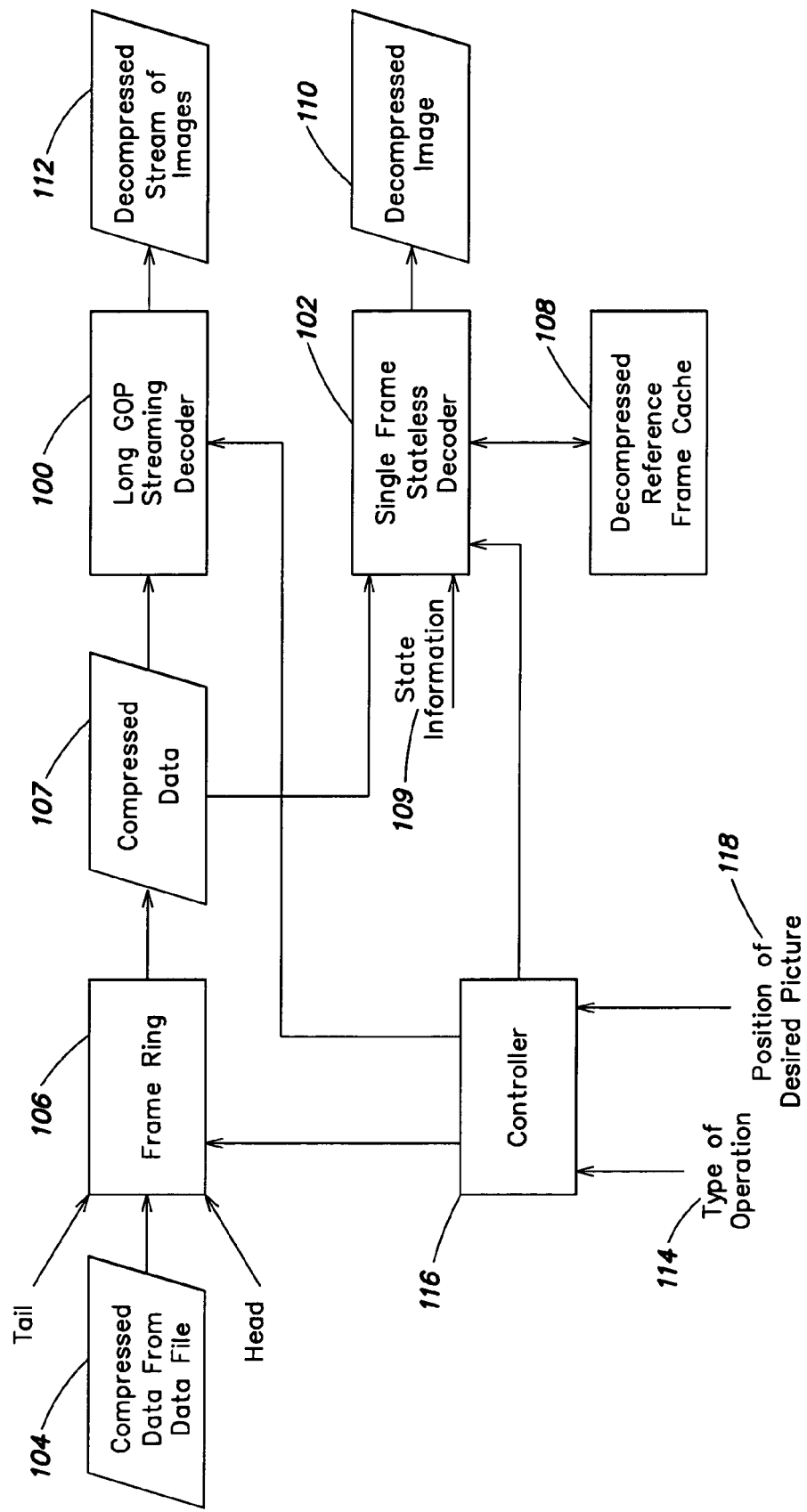
FIG. 1 is a block diagram of a video processing system that includes a streaming decoder and a single-frame stateless decoder.

Referring to FIG. 1, an editing system that handles off-speed and full speed playback of long GOP compressed video information will now be described. It should be understood that FIG. 1 describes the interaction of different components of a computer program. An implementation of such a system in hardware may have a similar structure.

The description below also presumes that the long GOP compressed video information is compressed in a manner such that all state information and decompression parameters are available with each I-frame in the compressed bitstream. Long GOP compressed video information may originate in this form or may be preprocessed to place it in such a form. If the long GOP compressed video information is not in this form, then an operation to decompress an image could involve searching all of the I-frames in the bitstream prior to the desired image to obtain the appropriate decompression parameters.

The system in FIG. 1 has a first decoder 100 for full-speed or slower forward playback of long GOP compressed motion video information 107, and thus produces a decompressed stream of images 112. A second single-frame, stateless, decoder 102 is used for off-speed playback to separately generate each decompressed image, as indicated at 110. The decoder 102 is stateless because it does not retain decompression parameters and reference frames extracted from the compressed bitstream from one decompression operation to the next.

When compressed data 104 is read from a file, the compressed data for at least one complete group of pictures is read into a buffer, herein called the compressed data buffer. A data structure, herein called a frame ring 106, describes each image stored in the compressed data buffer. The frame ring may be implemented as a ring buffer in software with an associated data structure that stores information about each frame. For example, the data structure may store information about a frame such as its sample number relative to the input stream, the offset in bytes of the frame in the compressed bitstream that is in the compressed data buffer, the length of the sample data in bytes, a pointer to the decoder that will use the compressed data, dimensions of a decompressed frame, an indication of the picture type (I-frame, P-frame or B-frame), the bitstream position of the sample, the video type (such as NTSC or PAL), and an indication of whether proxy data may be available. The frame ring also has a tail pointer and a head pointer, which indicate the current read and write positions into the compressed data buffer.

The single-frame, stateless decoder 102 receives decompression parameters (state information 109) in addition to the compressed data 107 for each image from this buffer. If the compressed data is a B-frame or P-frame, the uncompressed data for any other images required to decompress the frame (called a reference frame) also is input to the single-frame, stateless decoder. If the uncompressed data for the reference frames is not already in a cache 108, these reference frames are decompressed and the uncompressed data for the reference frames as used by the decoder is stored in the cache prior to the decompression of the B-frame or P-frame. The cache 108 may use a least-recently-used replacement strategy, and may hold uncompressed data for a number of reference frames. For example, for HDV material, the cache may be sized to store uncompressed data for about five to seven reference frames.

It should be noted that the form of the uncompressed data for a reference frame as used by the decoder typically is in a form that is different from the uncompressed reference frame that may be input to a display. For example, in MPEG-2 the uncompressed data for a reference frame as used by the decoder is in a form in which the data for each component for all pixels is separate from the data for all other components. Even if this uncompressed data for a reference frame is in the cache, it is still input from the cache to the decoder to produce the uncompressed frame for display.

The uncompressed data for a reference frame is managed by a data structure that stores, along with the uncompressed data, information such as the data stream from which the reference frame originated, the disk order frame index of the compressed data associated with the reference frame, and its size (e.g., in bytes). The cache is managed by a data structure that stores the total number of entries in the cache, the number of used entries, the number of free entries, the size of each entry and a list of pointers to the free and used entries, with the used entries ordered by their time of use. This data structure may be associated with operations that add an entry to the cache, read an entry in the cache, determine if a reference frame is in the cache (as indicated by an indicator of the stream from which it originates and its disk order index), and empty the cache.

Whether the long GOP streaming decoder is used depends on the type of playback operation being performed. An indication of this operation (as indicated at 114) is provided to a controller 116. The temporal position 118 in the playback stream that is requested for playback also is provided to the controller 116.

If the type of operation involves forward playback of long GOP compressed motion video information at a rate anywhere greater than zero and less than or equal to its full frame rate (0<playback rate<=full frame rate), then the streaming decoder 100 is used.

If the type of operation involves reverse playback or fast forward playback (playback rate<=0, or playback rate>full frame rate), then the single-frame, stateless decoder 102 is used. Such operations include, but are not limited to, trimming, scrubbing, jogging, shuttling, reverse and fast forward play. As a special case, it is possible to disable the caching mechanism in the single-frame stateless decoder when a fast forward playback operation is invoked that involves a rate of play such that the reference frames in the cache are not likely to be used. Such a playback rate typically is about three times the full frame rate for most long GOP compressed material.

More details about the operation and structure of the various components of FIG. 1 will now be described in more detail in connection with FIGS. 2-7.

Figure 2:
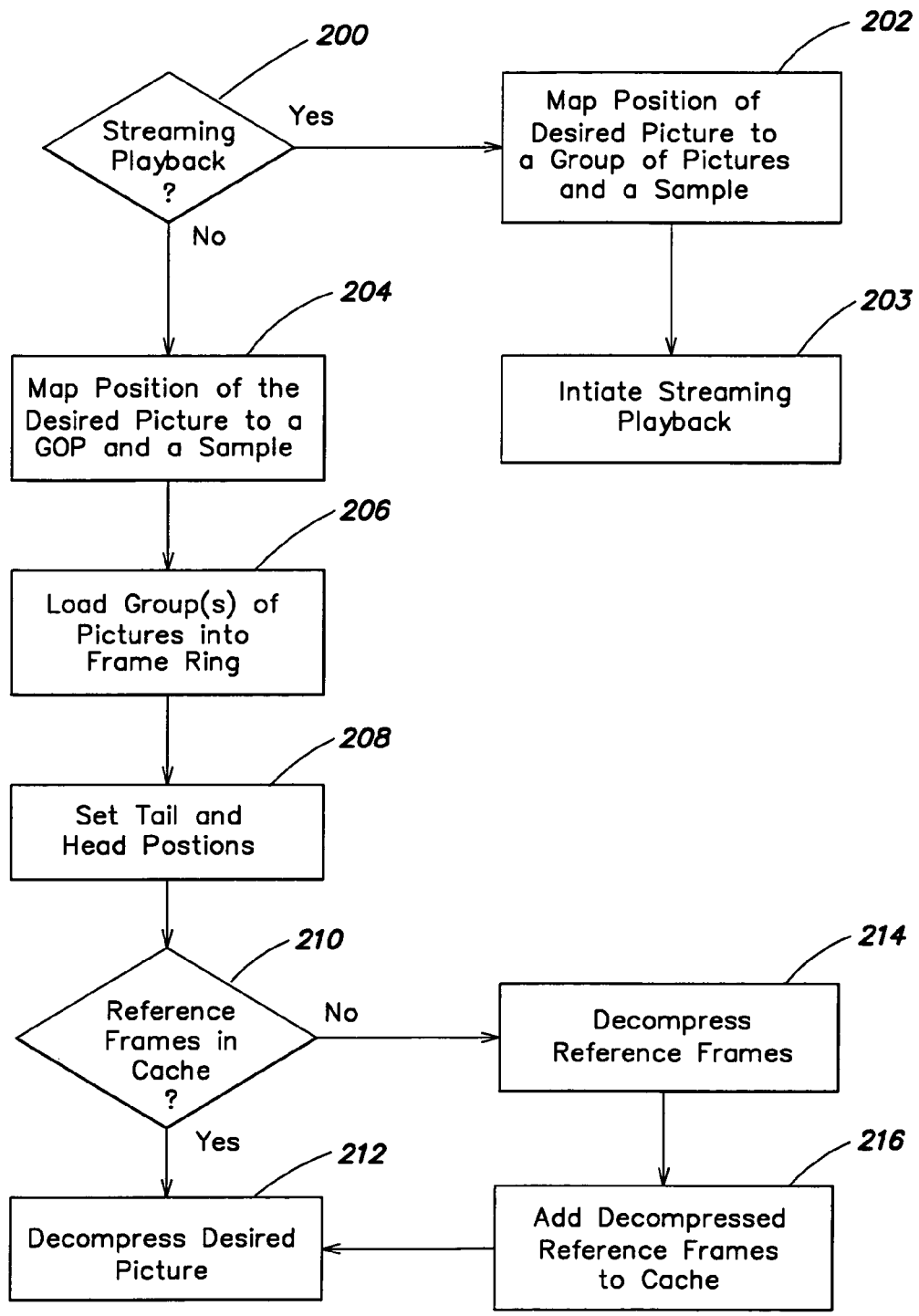
FIG. 2 is a flowchart describing how the decoders of FIG. 1 decompress video information.

FIG. 2 is a flowchart describing how the controller prepares data in the frame ring 106 (FIG. 1) for decompression. If streaming playback is to be performed (as determined at 200), the indicated position in the stream of the desired picture from which playback should begin is mapped 202 to a group of pictures in the compressed bitstream that contains the sample data for the desired picture. Playback by the streaming decoder can be initiated 203 with this information. Otherwise, the indicated position in the stream for which the corresponding single frame image is to be decompressed is mapped 204 to the group of pictures in the compressed bitstream that contains the sample data for the desired picture. While the mapping 202 and 204 can be implemented in the same manner for both streaming playback and single frame playback, the starting point is determined once for streaming play, but is determined for each image displayed for single frame playback.

As an example of the mapping operation, the indicated position may be a temporal position in the frame of reference of a video program that contains a scene defined by long GOP motion video information. This position is mapped to a temporal position within the sequence of images in the source data file that stores the long GOP motion video information. This temporal position is mapped to a position of the desired picture in the bitstream order for the compressed data, and to the offset in the bitstream for the compressed data for the group of pictures that contains it, and an offset to the compressed data for the desired picture.

After the group of pictures containing the desired image is identified, it is loaded 206 into the compressed data buffer and the frame ring is set up. The frame ring data structure can be checked to determine in the group of pictures is already stored in the compressed data buffer to avoid reading the data unnecessarily from a file into the compressed data buffer.

For streaming playback, the compressed data starting with the group of pictures containing the desired image is read into the compressed data buffer. The amount of compressed data to be read at any given point in time during playback is determined by what amount of data would efficiently use the resources of the file system, implementing "efficient" reads such as described in U.S. Pat. No. 5,045,940.

For offspeed forward playback or for single frame play, two groups of pictures are read into the compressed data buffer along with a portion of the compressed data from the beginning of the following group of pictures, e.g., the first few frames after the I-frame up to the next reference frame. If the offspeed play is reverse play, then only one group of pictures is read into the compressed data buffer. The tail position is set 208 to the I-frame of the group of pictures, and the head pointer is set to the last frame of the group of pictures.

After the group of pictures containing the desired picture is confirmed to be in the frame ring, it is determined (as indicated at 210) whether the uncompressed data for the reference frames related to the desired image are in the reference frame cache. For example, given the position of the desired picture in the frame ring, the contents of the frame ring are reviewed to identify any reference frames required to process the desired picture. For example, a P-frame requires the previous reference frame; a B-frame requires the two previous (in the bitstream) reference frames. If the uncompressed data for the required reference frames is in the cache, then the desired picture can be decompressed as indicated at 212; if not, then the required reference frames are decompressed first and their corresponding uncompressed data as used by the decoder is placed 216 in the cache, and then the desired picture can be decompressed.

One way to decompress a desired picture while ensuring uncompressed data for any required reference frame is in the reference frame cache will now be described. In particular, the tail pointer for the frame ring is initially set to the desired picture. The following process moves the tail pointer back in the group of pictures according to the contents of the reference frame cache to a point in the group of pictures at which decompression begins.

If the desired picture is an I-frame, then the tail pointer remains at the desired picture. If its uncompressed data is in the reference frame cache then the decoder is instructed to produce the decompressed frame using the uncompressed data from the reference frame cache. If its uncompressed data is not in the reference frame cache, then the compressed data for this I-frame is decompressed. The uncompressed data produced by decompressing this I-frame is stored in the reference frame cache and the decoder outputs the decompressed frame. The cache is updated to indicate that the uncompressed data for this I-frame is the most recently used.

If the desired picture is a P-frame, then the tail pointer initially remains at the desired picture. If its uncompressed data is in the reference frame cache then the decoder is instructed to produce the decompressed frame using the uncompressed data from the reference frame cache. If its uncompressed data is not in the reference frame cache then the frame ring is searched backwards for the closest prior reference frame for which uncompressed data is in the reference frame cache. The tail pointer is set to this closest prior reference frame. Decoding of the compressed data begins from this tail pointer as described below. The cache is updated to indicate that the uncompressed data for the desired P-frame is the most recently used.

If the desired picture is a B-frame then uncompressed data from two preceding reference frames in the compressed bitstream is used. Starting from the desired picture, the characteristics of each picture in the frame ring are evaluated to identify the first corresponding reference frame. The reference frame cache is evaluated to determine if its uncompressed data is in the reference frame cache.

If the uncompressed data for the first reference frame is not in the cache, then the first reference frame is to be decompressed and the tail pointer is moved to the first reference frame. The frame ring is searched for the second reference frame. If the uncompressed data for this second reference frame is in the reference frame cache then the tail pointer remains at the first reference frame. If the uncompressed data for this second reference frame is not in the reference frame cache, then the tail pointer is moved to the second reference frame.

If the uncompressed data for the first reference frame is in the cache, then the tail pointer remains at the desired picture and the frame ring is searched for the second corresponding reference frame. If the uncompressed data for this second reference frame is in the reference frame cache, then the tail pointer remains at the desired picture. If the uncompressed data for this second reference frame is not in the reference frame cache, then the tail pointer is moved to the second reference frame.

If the tail pointer is moved to the second reference frame, then the frame ring is searched backwards further for the closest prior reference frame for which uncompressed data is in the reference frame cache. The tail pointer is set to this closest prior reference frame.

Note that it is possible for a B-frame to refer to a reference frame from a prior group of pictures in the compressed bitstream. In such a case, it is possible that all the reference frames of the prior group of pictures and the first reference frame in the group of pictures containing the B-frame will be decompressed to produce the desired picture.

For P-frames and B-frames, after the tail pointer has been moved appropriately, the decoder is then instructed to decompress the compressed data for the reference frames in the compressed data buffer starting with the frame indicated by the tail pointer, after which it decompresses the desired picture. The uncompressed data for the decompressed reference frames as used by the decoder is stored in the reference frame cache, and each entry is updated according to its most recently used status. The uncompressed reference frames for display preceding the desired frames need not be generated or returned because they do not need to be displayed. The decoder can skip decompressing any B-frames between the reference frames and between the last reference frame and the desired picture.

During decompression of the reference frames prior to the desired picture, the contents of the reference frame cache also are checked to determine if the uncompressed data for the reference frame is already in the cache. If the uncompressed data for the reference frame is in the cache, then its compressed data is not decompressed. However, its entry is updated to reflect its recent use. The decoder then processes the next picture. Such a situation can occur, for example, if the uncompressed data for the first reference frame for a B-frame is in the cache, but the uncompressed data for the second reference frame is not.

If the desired picture is an I-frame or a P-frame, its uncompressed data as used by the decoder is placed in the reference frame cache. If the desired picture is a B-frame, its decompressed data is not placed in the reference frame cache.

The following examples illustrate how different operations impact the operation of the decoder and the use of the cache.

Figure 3:
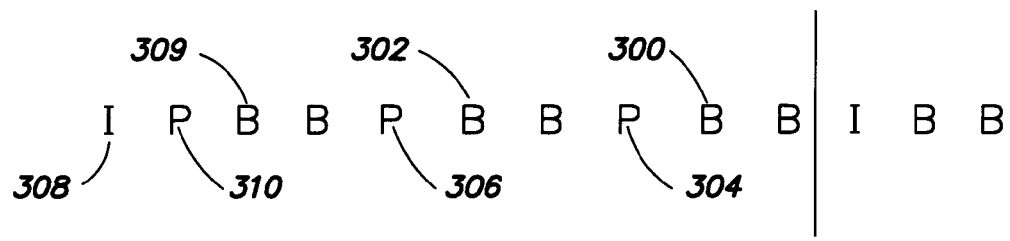
FIG. 3 illustrates an example where an image in a group of pictures has already been decompressed and a prior image in the same group of pictures has now been indicated as the desired picture to be displayed.

FIG. 3 illustrates an example where an image in a group of pictures has already been decompressed and a prior image in the same group of pictures has now been indicated as the desired picture to be displayed. Assume the current display position is the B-frame 300. At this point, uncompressed data for I-frame 308 and P-frames 310, 306 and 304 would be in the reference frame cache. Then B-frame 302 is selected by the user as the desired picture to be displayed. B-frame 302 uses uncompressed data from P-frames 310 and 306 to be decompressed. Because this uncompressed data is already in the reference frame cache, it is provided to the decoder along with the compressed data for B-frame 302 to produce the decompressed frame.

Figure 4:
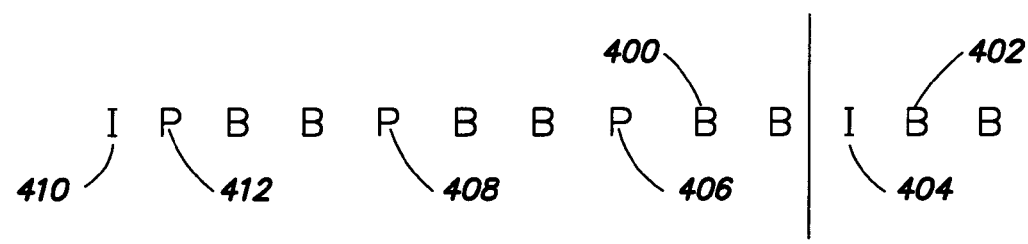
FIG. 4 illustrates an example where an image in one group of pictures has already been decompressed and an image from a subsequent group of pictures has now been indicated as the desired picture to be displayed.

FIG. 4 illustrates an example where an image in one group of pictures has already been decompressed and an image from a subsequent group of pictures has now been indicated as the desired picture to be displayed. Assume the current display position is the B-frame 400. At this point, uncompressed data for I-frame 410 and P-frames 412, 408 and 406 would be in the reference frame cache. Then B-frame 402 is selected by the user as the desired picture to be displayed. B-frame 402 uses uncompressed data from I-frame 404 and P-frame 406 to be decompressed. Because the uncompressed data for P-frame 406 is already in the reference frame cache, but for I-frame 404 is not, the tail pointer is moved to the I-frame 404 and it is decompressed. Its uncompressed data is stored in the reference frame cache. B-frame 402 then can be decompressed using the uncompressed data from the reference cache for I-frame 404 and P-frame 406.

Figure 5:
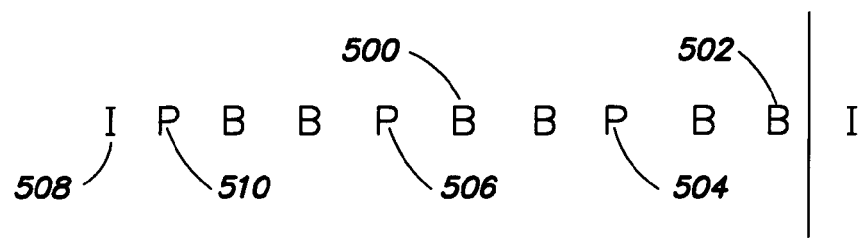
FIG. 5 illustrates an example where an image in a group of pictures has already been decompressed and a subsequent image in the same group of pictures has now been indicated as the desired picture to be displayed.

FIG. 5 illustrates an example where an image in a group of pictures has already been decompressed and a subsequent image in the same group of pictures has now been indicated as the desired picture to be displayed. Assume the current display position is the B-frame 500. At this point, uncompressed data for I-frame 508 and P-frames 510 and 506 would be in the reference frame cache. Then B-frame 502 is selected by the user as the desired picture to be displayed. B-frame 502 uses uncompressed data from P-frames 504 and 506 to be decompressed. Because the uncompressed data for P-frame 506 is in the cache, but for P-frame 504 is not, the tail pointer is moved to the P-frame 504 and it is decompressed. Its uncompressed data is stored in the reference frame cache. B-frame 502 then can be decompressed using the uncompressed data from the reference cache for P-frame 504 and P-frame 506. Note that the B-frame between P-frame 504 and B-frame 502 can be skipped.

FIG. 6 illustrates an example where an image in one group of pictures has already been decompressed and an image from a prior group of pictures has now been indicated as the desired picture to be displayed. Assume the current display position is the B-frame 600. At this point, uncompressed data for I-frame 604 and P-frame 610 would be in the reference frame cache. Then B-frame 602 is selected by the user as the desired picture to be displayed. B-frame 602 uses uncompressed data from P-frames 606 and 610 to be decompressed. Because the uncompressed data for these P-frames is in the cache, and the uncompressed data for the I-frame 608 is also not in the cache, the tail pointer is moved to the I-frame 608 and it is decompressed. Its uncompressed data is stored in the reference frame cache. P-frames 610 and 606 then can be decompressed in turn, and their uncompressed data is stored in the reference frame cache. The B-frames between P-frames 610 and 606 can be skipped. B-frame 602 then can be decompressed using the uncompressed data from the reference cache for P-frames 610 and 606.

In all the examples above only five reference frames are shown. If the reference frame cache holds uncompressed data for at least five reference frames, no entries are deleted from the reference frame cache.

FIG. 7 illustrates an example of how a condition arises in which uncompressed data for the first reference frame for a B-frame is in the cache, but uncompressed data for the second reference frame is not in the cache, due to an entry being deleted from the cache. This example assumes a reference frame cache with five entries. In this example, if the first position is frame 0, an I-frame 700, the cache contains the uncompressed data for just frame I0. The next desired position is frame 9, a P-frame 702. After frame 9 is displayed the reference frame cache will contain the uncompressed data for frames I0, P3 (704), P6 (706) and P9 (702). If frame 11, a B-frame 708, is the next desired picture, after it is decompressed the reference frame cache will contain the uncompressed data for frames I0, P3, P6, P9 and P12 (710). If the next frame is frame 17, a B-frame 716, after it is decompressed the reference frame cache will contain the uncompressed data for frames P6, P9, P12, I15 (712) and P18 (714). The uncompressed data for frames I0 and P3 will be dropped from the cache. If the next frame is frame I0, its uncompressed data will not be in the cache, so it will need to be decompressed. Its uncompressed data will then be added to the cache, and the contents of the cache will be the uncompressed data for frames P9, P12, I15, P18 and I0. If the next frame is frame 7, a B-frame 718, the cache will contain reference frames P9 and I0, but not reference frames P6 and P3. Therefore, the tail pointer will be set to frame P3, which will be decompressed using the uncompressed data for frame I0 from the cache. The tail pointer is then moved to frame P6. Frame P6 will be decompressed using the uncompressed data for frame P3 from the cache. Because uncompressed data from frame P9 is already in the cache, the tail pointer is moved to frame B7, which is decompressed using the uncompressed data for frames P6 and P9 from the cache.

Each stream or track of video information available in an editing system for editing a video program may have its single-frame, stateless long GOP decoder with its own cache. However, because there may be many decoders, allocation of the cache for a stream may be delayed until it will be used.

Such a single-frame, stateless long GOP decoder can be used in a system that permits multiple different compression formats for motion video information to be edited together. For example, the compressed data buffer may contain any form of compressed data and the frame ring describes this compressed data. The decoder used to decompress data in the compressed data buffer is selected according to the type of the compressed data as indicated by the frame ring. Such a structure permits multiple different formats of video to be used in a single stream or track in an edited video program. To support editing of programs with multiple streams or tracks of video, a compressed data buffer, frame ring and appropriate decoders are provided for each of multiple streams of video.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A process for supporting off-speed playback of video data encoded using long groups of pictures, comprising:
   determining whether playback of video is off speed or streaming playback;
   if the playback of video is streaming playback, reading compressed data for the video to be played back into a compressed data buffer and instructing a streaming video decoder to playback the video in the compressed data buffer;
   if the playback of video is off speed playback, then receiving an indication of a single frame to be played back;
   reading compressed data for a group of pictures containing the single frame into the compressed data buffer;
   displaying a single frame from among frames in the group of pictures by:
      maintaining uncompressed data for most recently used reference frames in a decompressed reference frame cache in a form usable by a decoder;
      identifying at least one reference frame of the group of pictures used to decompress the single frame;
      determining if uncompressed data for the at least one reference frame is in the cache;
      decompressing compressed data from the buffer for at least one reference frame of the group of pictures used to decompress the single frame and storing the uncompressed data in the cache, if the uncompressed data for the at least one reference frame is not in the cache;
      retrieving the uncompressed data for the at least one reference frame from the cache;
      providing the uncompressed data for at least one reference frame from the cache, the compressed data from the buffer for the single frame and state information including decompression parameters to a stateless, single frame decoder, wherein the stateless, single frame decoder does not retain reference frames extracted from the compressed data from one decompression operation to the next; and
      receiving from the stateless, single frame decoder the decompressed data for the single frame.

2. A motion video editing system, comprising:
- storage for making available data files containing video data encoded using long groups of pictures;
- an editing interface enabling a user to specify a sequence of clips of video data from the data files in the storage;
- a compressed data buffer into which video data from the storage is read and temporarily stored before playback;
- a streaming decoder having an input for receiving video data encoded using long groups of pictures from the compressed data buffer and an output for providing a stream of decompressed data for a sequence of images from the received video data;
- a stateless, single frame decoder, having inputs for receiving uncompressed data for at least one reference frame from video data encoded using long groups of pictures from a decompressed reference frame cache, compressed data for a single frame from the encoded video data from the compressed data buffer, and state information for decompressing the encoded video data and an output for providing decompressed data for the single image, wherein the stateless, single frame decoder does not retain reference frames extracted from the encoded video data from one decompression operation to the next;
- wherein the decompressed reference frame cache maintains uncompressed data for most recently used reference frames in a form usable by the decoder;
- wherein, in response to a request through the editing interface for playback of a plurality of images at frill frame rates, the streaming decoder is used to playback the plurality of images from the compressed data buffer; and
- wherein, in response to a request through the editing interface for playback of one or more images at an offspeed rate, the stateless, single frame decoder is used to separately decode and playback each of the one or more images from the compressed data buffer and using the decompressed reference frame cache;
- wherein the decoder determines if uncompressed data for a reference frame is in the cache, and the decoder decompresses compressed data from the buffer for the reference frame and updates the cache to include the uncompressed data if the uncompressed data is not in the cache.

3. The motion video editing system of claim 2, wherein the video data encoded using long groups of pictures includes MPEG-2 data.

4. The process of claim 1, wherein the compressed data buffer has an associated frame ring data structure that describes, for each frame in the compressed data buffer, information about the frame.

5. The process of claim 4, wherein the information about the frame includes at least an indication of a picture type for the frame.

6. The process of claim 4, wherein the information about the frame includes at least a bitstream position of the compressed data for the frame.

7. The process of claim 4, wherein the information about the frame includes at least a sample number for the frame.

8. The process of claim 1, wherein the cache has an associated cache data structure that describes, for each frame in the cache, a data stream from which the frame originated and an index for the frame in the data stream.

9. The process of claim 8, wherein entries about frames in the cache data structure are sorted by time of use.

10. The process of claim 1, wherein, for offspeed forward playback, two or more groups of pictures are read into the compressed data buffer.

11. The motion video editing system of claim 2, wherein the compressed data buffer has an associated frame ring data structure that describes, for each frame in the compressed data buffer, information about the frame.

12. The motion video editing system of claim 11, wherein the information about the frame includes at least an indication of a picture type for the frame.

13. The motion video editing system of claim 11, wherein the information about the frame includes at least a bitstream position of the compressed data for the frame.

14. The motion video editing system of claim 11, wherein the information about the frame includes at least a sample number for the frame.

15. The motion video editing system of claim 2, wherein the cache has an associated cache data structure that describes, for each frame in the cache, a data stream from which the frame originated and an index for the frame in the data stream.

16. The motion video editing system of claim 15, wherein entries about frames in the cache data structure are sorted by time of use.

17. The motion video editing system of claim 2, wherein, for offspeed forward playback, two or more groups of pictures are read into the compressed data buffer.

* * * * *